G. W. RAMSEY.
TYPE WRITER.
APPLICATION FILED APR. 27, 1910.

1,169,678.

Patented Jan. 25, 1916.

WITNESSES
J. A. Bishop
M. B. Nichols

INVENTOR
George W. Ramsey.

UNITED STATES PATENT OFFICE.

GEORGE W. RAMSEY, OF PEORIA, ILLINOIS.

TYPE-WRITER.

1,169,678.  Specification of Letters Patent.  Patented Jan. 25, 1916.

Application filed April 27, 1910. Serial No. 557,994.

*To all whom it may concern:*

Be it known that I, GEORGE W. RAMSEY, a resident of Peoria, county of Peoria, State of Illinois, whose post-office address is Provident Bank Building, Washington, District of Columbia, have invented certain new and useful Improvements in Type-Writers, of which the following is a specification.

This invention relates broadly to the typewriter art, and specifically to line spacing mechanism adapted for "condensed billing".

The object of my invention is to provide a simple, improved, and automatic mechanism for removing the detent roller from the line space wheel when the "condensed billing" mechanism is operated.

My invention comprises a simple mechanism which may be adapted to any style of "condensed billing" device, but it is herein illustrated and described as being particularly adapted to the mechanism for "condensed billing" as disclosed in patent to McCormack 887,419, May 12, 1908.

In the preferred form of my invention a mutilated disk is mounted beside the line space wheel in such manner as to lie beneath a part of the detent roller, which is sufficiently broad to cover the face of the line space wheel and to extend a short distance over one side thereof. The major part of the disk is of greater diameter than the line space wheel. A portion of the disk is cut away and this part is adapted to be beneath the detent roller when the "condensed billing" lever is in inoperative position. This lever is mounted on the tubular member which carries the mutilated disk. As the "condensed billing" lever is actuated, the disk revolves and the detent roller is raised from the teeth of the line space wheel, thus permitting the line space mechanism to operate more freely, without the jar and noise caused by the detent roller in passing over the teeth of the line space wheel, and thereby obviating wear on the roller and teeth.

In the specification and drawings my invention is shown and particularly described as adapted to a structure wherein the "condensed billing" mechanism and the line spacing mechanism are on opposite ends of the platen.

This invention is believed to be broadly new and is therefore capable of being embodied in widely different structures, therefore I desire that the specification and the accompanying drawings be taken as illustrative and not in a limiting sense.

Figure 1:
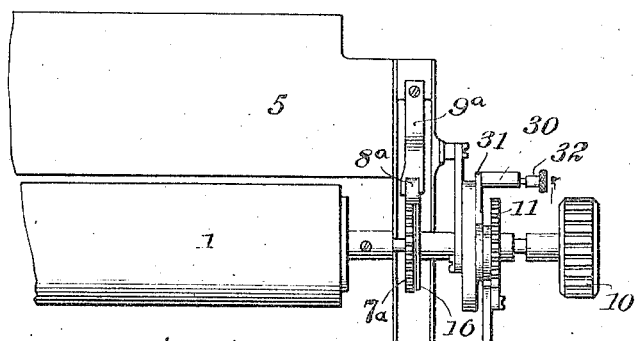
Figure 4:
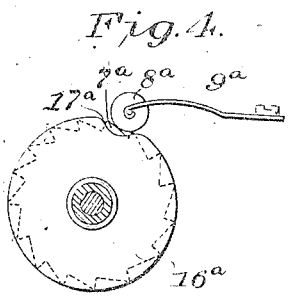
Figure 2:
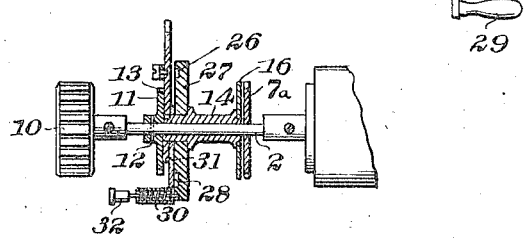
Figure 3:
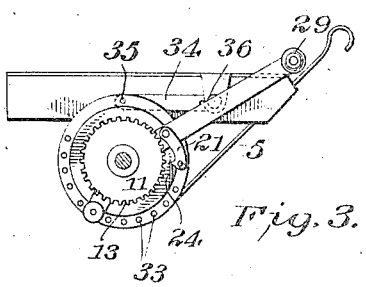
Figure 6:
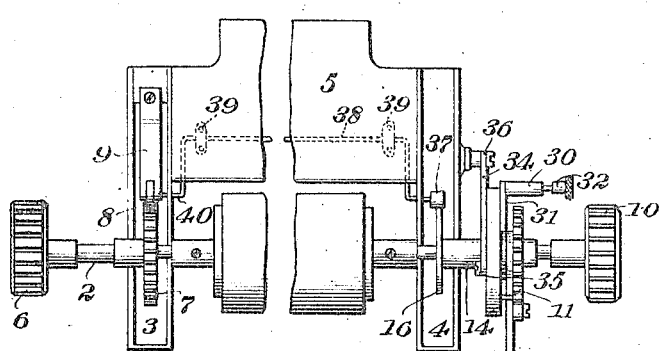
Figure 5:
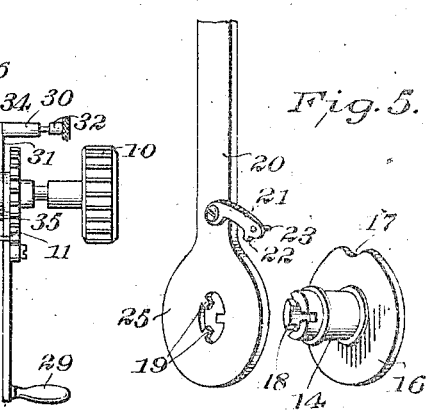

In the drawings, wherein like characters represent like parts throughout the various figures: Figure 1 is a plan view of one end of a typewriter carriage frame showing my improvement. Fig. 2 is a sectional elevation showing the relationship of the parts in Fig. 1. Fig. 3 is an end elevation showing the "condensed billing" mechanism in inoperative position. Fig. 4 is a detail elevation showing the relationship of the disk to the line space wheel and detent. Fig. 5 is a detail view showing parts in detached perspective. Fig. 6 is a view showing my invention adapted to a machine in which the "condensed billing" mechanism and the line spacing mechanism are on different ends of the platen.

The usual cylindrical platen 1 of a typewriting machine is fixed upon an axle 2 journaled in the ends 3 and 4 of the platen frame, to the rear of which is the paper table 5. The end of the axle projecting through the platen frame end 3 has a finger wheel 6 (see Fig. 6) thereon, by means of which the platen may be rotated forwardly or backwardly to an unlimited extent. The platen is also provided with the usual line spacing devices, of which a toothed line space wheel 7, a detent roller 8, and spring 9 therefor, are shown in Fig. 6. The line space wheel is adapted to be advanced intermittently by a pawl and lever, not shown. The platen axle 2 is arranged to project a greater distance through the frame 4 than it projects through the frame 3. The end of the axle 2, projecting through the frame 4, carries a finger wheel 10, which may be used similarly to the finger wheel 6 for rotating the platen 1 forwardly or backwardly. A wheel 11 is securely mounted on the axle 2 by means of the pin 12, and carries on its periphery teeth 13, which agree in number with the teeth of the line space wheel 7. A sleeve 14 is mounted upon the shaft 2, and carries upon its inner end a disk 16 which is cut away at 17 for a purpose which will be explained later. The outer end of the sleeve 14 is recessed as at 18 to provide openings for the reception of the lugs 19 carried by a crank 20.

The wheel 11 is adapted to be rotated by means of a pawl 21 which is pivotally mounted upon the crank 20, and which is formed with a tooth 22 that is adapted to engage the teeth 13 of the wheel 11 when the crank 20 is actuated, but it is normally disengaged therefrom, as is shown in Fig. 3, to permit independent rotation of the platen 1. Said pawl 21 carries a pin 23 which is normally pressed by a spring 24 into a notch 26 formed in a stationary disk like member 27, which is loosely mounted upon the outer portion of sleeve 14, and which is held from rotating when the sleeve 14 is turned, by means of a link 34 which is attached to the member 27 by means of a screw as at 35, and to the platen frame as at 36. When the crank 20 is pulled forward the pin 23 is pulled out of the notch 26 and thereafter travels in an annular groove 28 cut in the face of the member 27 concentric with the platen axle 2, the outer wall of said groove acting to confine the pawl so that its tooth 22 cannot escape from the wheel 11, and hence the platen must rotate backwardly and forwardly with the crank 20, which is provided with a finger piece 29.

An adjustable stop member 30 is mounted upon a carrying arm 31 which is adapted to rotate on the sleeve 14, and which is confined between the crank member 25 and the stationary disk member 27. The stop 30 carries a holding pin 32 which is adapted to engage any one of a series of holes 33 in the stationary disk member 27, and thus it will be seen that the stop 30 may be positioned at various desirable points around the periphery of the disk member 27.

When the crank 20 is in normal position as shown in Fig. 3, the disk 16 rests in such position that the roller 37, carried by the lever rod 38, is in position to drop into the notch 17. The lever rod 38 passes beneath the platen frame or paper table whereon it is supported by journal plates 39—39 and terminates in a lever end 40 just beneath the detent roller spring 9. When the roller 37 is in the notch 17 of the disk 16, and the detent roller 8 is resting between the teeth on the line spacing wheel 7, the lever end 40 is just in engagement with the under side of the spring 9. Since both the disk 16 and the crank 20 are rigidly attached to the sleeve 14, the disk 16 partakes of all the movements of the said crank. Therefore when the crank is pulled forward the disk 16 is turned, and as it turns the roller 37 rides out of the notch upon the periphery of the disk. As the roller 37 is lifted the lever end 40 of the lever rod 38 is raised, thus lifting the spring 9, and carries the detent roller 8 above the path of the teeth in the line space wheel 7.

In Figs. 1, 2, 3 and 4 I have shown my invention adapted to a typewriter carriage in which the condensed billing mechanism and the line spacing mechanism are both on the same end of the carriage frame. In this structure the detent roller 8ª is wide enough to engage both the line space wheel 7ª and the disk 16ª when the disk is moved from normal position. In this type of device the disk is arranged close to the line space wheel; and the disk, line space wheel and detent roller are normally in the relation shown in Fig. 4. When the crank is pulled forward the roller rides on the periphery of the disk, and is lifted above the teeth of the line space wheel thus allowing the detent roller to roll freely on the smooth edge of the disk, and permits the line space wheel to revolve free from the shock and jar occasioned by the detent roller jumping over the line space wheel teeth.

From the device herein disclosed it will be seen that my invention provides a mechanism which automatically lifts the detent roller from the line space wheel when the "condensed biller" is actuated, thus preventing the disagreeable noise and jar occasioned by the impact of the detent roller on the teeth of the line space wheel. My invention also makes the actuation of the mechanism much easier and the wear very much less.

Having thus described my invention I claim:—

1. In a device of the class described, a platen, line spacing devices, said line spacing devices including a line space wheel, and a detent normally in engagement with said line space wheel, in combination with mechanism for turning said platen in a forward direction and then in a backward direction, and means operated by said mechanism for removing said detent from said wheel during the operation of turning said platen in both directions.

2. In a device of the class described in combination, a platen, a line space wheel, a roller detent normally in engagement with the line space wheel, a rotatable cam adjacent said line space wheel and having the same axis of rotation as said line space wheel, mechanism for turning said platen in a forward direction and then in a backward direction, and means connecting said mechanism and said cam to rotate said cam and remove said detent from said line space wheel when said mechanism is operated.

3. In a typewriting machine, a revoluble platen, a line space wheel mounted adjacent one end of said platen to revolve therewith, a detent normally in engagement with said line space wheel, driving means adjacent the other end of said platen for rotating the platen one or more line spaces, and mechanism extending from one end of said platen to the other and actuated by said driving means to remove said detent from said line space wheel.

4. In a typewriting machine in combination, a carriage, a shaft mounted to rotate in said carriage, a line space wheel mounted upon said shaft, a detent normally in engagement with said line space wheel, mechanism constructed to rotate said line space wheel in a forward direction and also in a backward direction, and devices operated by said mechanism for rendering said detent inoperative.

5. In a typewriting machine in combination, a carriage, a line space wheel mounted upon said carriage at one side thereof, a detent normally in engagement with said line space wheel, mechanism mounted adjacent the opposite side of said carriage to rotate said line space wheel through one or more line spaces, and means extending across said carriage and operatively connecting said mechanism with said detent to render said detent inoperative when said mechanism is operated.

6. In a typewriting machine in combination, a line space wheel, a shaft on which said wheel is mounted, a driving device, a positive clutch between said driving device and said shaft, a holding device for said line space wheel, means operated by said driving device to release said holding device from said line space wheel when said clutch is operative and to reëngage said holding device with said line space wheel when said clutch is inoperative, whereby one of said devices is at all times in control of said shaft.

GEO. W. RAMSEY.

Witnesses:
 E. F. RILEY,
 J. ADOLPH BISHOP.